Patented Oct. 18, 1927.

1,645,693

UNITED STATES PATENT OFFICE.

CARLETON ELLIS, OF MONTCLAIR, NEW JERSEY.

COLD MOLDING COMPOSITION CONTAINING ORTHOCRESOL-ALDEHYDE RESIN BINDER AND PROCESS OF MAKING SAME.

No Drawing.     Application filed April 19, 1923. Serial No. 633,279.

This invention relates to a cold molding composition containing orthocresol-aldehyde resin binder and to the process of making same and from the standpoint of process relates especially to a series of steps involving treatment of orthocresol with formaldehyde or other aldehyde, incorporating with asbestos or other filling material, treating to adjust the coherent qualities of the material, molding in the cold, withdrawing from the mold and baking the shaped articles without the employment of pressure.

In the manufacture of phenol-formaldehyde resins orthocresol has not been used commercially to any large extent because of its low reactivity. For hot molding compositions phenol or metaparacresol are used because resins obtained therefrom harden rapidly under heat and pressure. Commercial cresol therefore is frequently treated to separate the orthocresol and the metapara mixture is used for molding compositions while the ortho compound has to find an outlet in other directions. It is true that orthocresol-formaldehyde resin has been used as a plasticizing agent in hot molding compositions and also has been employed in other ways in this field but as stated the preference is largely for the phenol and the metapara mixture. In times of shortage of phenolic compounds this may mean that the orthocresol is more readily available than the other phenolic material mentioned.

In making articles by the cold molding process a high speed of reaction such as is required in hot molding is undesirable. If the composition is highly reactive blistering and swelling of the molded material may result. The cold molding operation differs from hot molding primarily in the respect that the molding composition in powdered from is molded under great pressure in the cold, the shaped material is afterwards removed from the mold and baked at ordinary atmospheric pressure to bring about gradual hardening. If a marked reaction takes place during this baking step a large batch of molded articles may be spoiled causing considerable loss due to blistering and distortion.

The sluggish qualities of orthocresol are adapted for cold molding and in the present invention the object is to utilize this cresol to obtain articles which can be made at relatively low cost and possessing a high degree of strength.

The first step in the process is that of formation of the resin and for this purpose 100 parts by weight of commerical orthocresol, 50 parts paraform and 4 parts of aqueous caustic soda solution of 30 per cent strength are heated in a suitable container under a reflux condenser and on a vigorously boiling water bath. The mixture is agitated for 3½ hours while continuing the heating. A reddish turbid solid resin is obtained, soft at first but stiffening on standing a few hours to a brittle mass. It is soluble in alcohol and acetone but insoluble in benzol. On heating at 150° C. to constant weight there is a loss of about 20 per cent volatile matter.

The second step is incorporation of filling material and any other additions required to improve the molding quality of the mix. Cold molded products generally require a high resistance to heat hence a mineral filler such as asbestos fibre or powder or other mineral fillers commonly employed in the plastic art may be used. For products not requiring so high a resistance to heat wood flour may be used as a filler. For purposes of illustration the use of asbestos will be described herein.

20 parts by weight of the orthocresol-formaldehyde resin prepared according to the foregoing procedure are dissolved in an equal weight of acetone. 2 parts of tung oil are added and the solution mixed with 75 parts of asbestos flour.

As stated it is necessary to obtain a mass which is coherent under high pressure and in the present instance the resin produced as above does not possess the desired degree of coherency. The coherency is improved by adding the tung oil or other drying oil and by exposing the composition to a drying treatment which removes the volatile solvent and causes the resin to harden in presence of the tung oil.

Good results have been obtained from the foregoing mix by drying in the air in a thin layer at 70° C. for 1 hour. The resin is changed in its consistency and coherent properties by such heat treatment and the tung oil is presumably somewhat oxidized.

At this point the mix is ready for cold molding and is subjected to a pressure of 15,000 pounds per square inch. Discs of material of this character molded under these conditions were baked under a gradually increasing temperature. The discs were removed from the molds and placed in an oven at atmospheric pressure at an initial temperature of 60° C. and were gradually heated taking particular pains at about 100° C. to allow the temperature to increase very slowly. This is a blistering point which has to be carefully watched owing to the evolution of water. After passing 100° C. the temperature may be more rapidly raised finishing at 140° C. The rate of heating may be for example 25 hours or somewhat longer to reach 100° C. and 6 hours additional to reach 140° C.

The condition of plasticity or coherency may be determined during the drying operation by withdrawing small samples and testing in a press. When the right stage of transformation has been reached such that the mixture will mold readily the material is removed from the drying closet and allowed to cool.

The breaking strength of discs made according to the foregoing showed somewhat over 7 pounds per millimeter of thickness which is a very satisfactory strength and somewhat unexpected in view of the general opinion that orthocresol does not react appropriately to yield tough infusible products of a commercially valuable character.

Numerous variations may be made in the foregoing procedure. The reaction carried on above is with paraform and consequently only a small amount of water will be present. This may be removed from the resin if desired prior to incorporation with the solvent. In addition to carrying out the reaction under conditions approximating the anhydrous the process may also be carried out with the aid of ordinary aqueous formaldehyde. Thus 100 parts by weight of orthocresol, 125 parts formaldehyde 40 per cent strength, and 1 gram of an aqueous solution of caustic soda containing 25 per cent of the latter are heated together under a reflux condenser with agitation on a water bath. The heating and agitation is carried on for 1½ hours and the water which separates is distilled at atmospheric pressure. Under these conditions it is desirable to continue the agitation. Vacuum distillation also may be used.

A yellow opaque resin is obtained which is hard and brittle and soluble in alcohol and acetone. In using this material in preparing cold molding composition the addition of 10 to 20 per cent of tung oil based on the weight of the resin is desirable in order to temper the resin and give the molding composition an appropriate degree of coherency.

It may be added that instead of carrying out the distillation under reflux condenser at atmospheric pressure an autoclave may be used to avoid loss of the reacting materials. This also applies to the procedure outlined above employing paraform.

Besides formaldehyde and its polymers other aldehydes such as acetaldehyde, paraldehyde, furfural, acrolein, butylaldehyde and other aldehydic bodies of appropriate characteristics may be used to replace formaldehyde in whole or in part. Other sluggishly reacting phenolic bodies such as the phenoliod substances present in tar obtained by low temperature carbonization also may be used.

In the present invention a desirable step is that of tempering the mixture to give it an appropriate degree of consistency. This is accomplished as indicated preferably by the addition of a drying oil such as linseed or tung oil or by the addition of a volatile solvent or both and exposing the mixture in thin layers to heat in order to dry, oxidize and chemically change the binding material to the point at which a suitable degree of coherency is obtained. The molding composition so tempered then is preferably subjected to grinding as the drying operation may cause the formation of lumps. By grinding and passing through a screen of a size adapted to conform to the character of the filler used a more uniform product is obtained. This is desirable when producing articles of a light yellow or brown color as irregularities of the mixture affect the appearance of the surface.

Thus prepared a molding powder or composition is obtained which is capable of readily welding together on cold pressing without any objectionable sticking to the mold.

What I claim is:—

1. A molding composition comprising orthocresol-formaldehyde resin, a drying oil and asbestos filler tempered to a state of coherency whereby the particles of the mixture can be welded together by applying heavy pressure in the cold; said composition being capable of becoming infusible on protracted heating.

2. A molding composition comprising orthocresol-formaldehyde resin, tung oil and asbestos filler tempered to a state of coherency whereby the particles of the mixture can be welded together by applying heavy pressure in the cold; said composition being capable of becoming infusible on protracted heating.

3. The process of making a molding composition adapted to be molded in the cold and baked at atmospheric pressure after removal from the mold which comprises reacting on orthocresol with formaldehyde in the presence of a catalyst to form a resin, incorporating the resin with tung oil and a filler and drying and heating the mixture whereby a granular material of a coherency adapted for cold molding is obtained.

4. The process which comprises reacting on orthocresol with formaldehyde in the presence of an alkaline catalyzer to form a resin, incorporating with an asbestos filler and a drying oil and bringing the composition to molding temper.

CARLETON ELLIS.